United States Patent [19]

Leutner et al.

[11] 4,025,352
[45] May 24, 1977

[54] MANUFACTURE OF SULFUR CONCRETE

[75] Inventors: Bernd Leutner, Maxdorf; Lothar Diehl, Ludwigshafen, both of Germany

[73] Assignee: BASF Aktiengesellschaft, Ludwigshafen, Germany

[22] Filed: Dec. 16, 1975

[21] Appl. No.: 641,355

[30] Foreign Application Priority Data

Dec. 24, 1974 Germany .......................... 2461483
July 31, 1975 Germany .......................... 2534230

[52] U.S. Cl. ................................ 106/70; 106/71
[51] Int. Cl.² ................................ C04B 33/04
[58] Field of Search ....................... 106/70, 71

[56] References Cited

UNITED STATES PATENTS

| | | | |
|---|---|---|---|
| 1,808,081 | 6/1931 | Sullivan | 106/70 |
| 2,280,301 | 4/1942 | Ray | 106/70 |
| 3,337,355 | 8/1967 | Dale | 106/70 X |
| 3,421,911 | 1/1969 | Greco | 106/70 X |
| 3,929,947 | 12/1975 | Schwartz et al. | 106/90 X |

*Primary Examiner*—Winston A. Douglas
*Assistant Examiner*—John F. Niebling
*Attorney, Agent, or Firm*—Keil, Thompson & Shurtleff

[57] ABSTRACT

Sulfur concrete which exhibits improved compressive strength and flexural strength, and improved corrosion characteristics, is manufactured by mixing sulfur, dicyclopentadiene and aggregate at from 120° to 160° C. The period for which the sulfur and dicyclopentadiene interact should not exceed certain limits.

8 Claims, 1 Drawing Figure

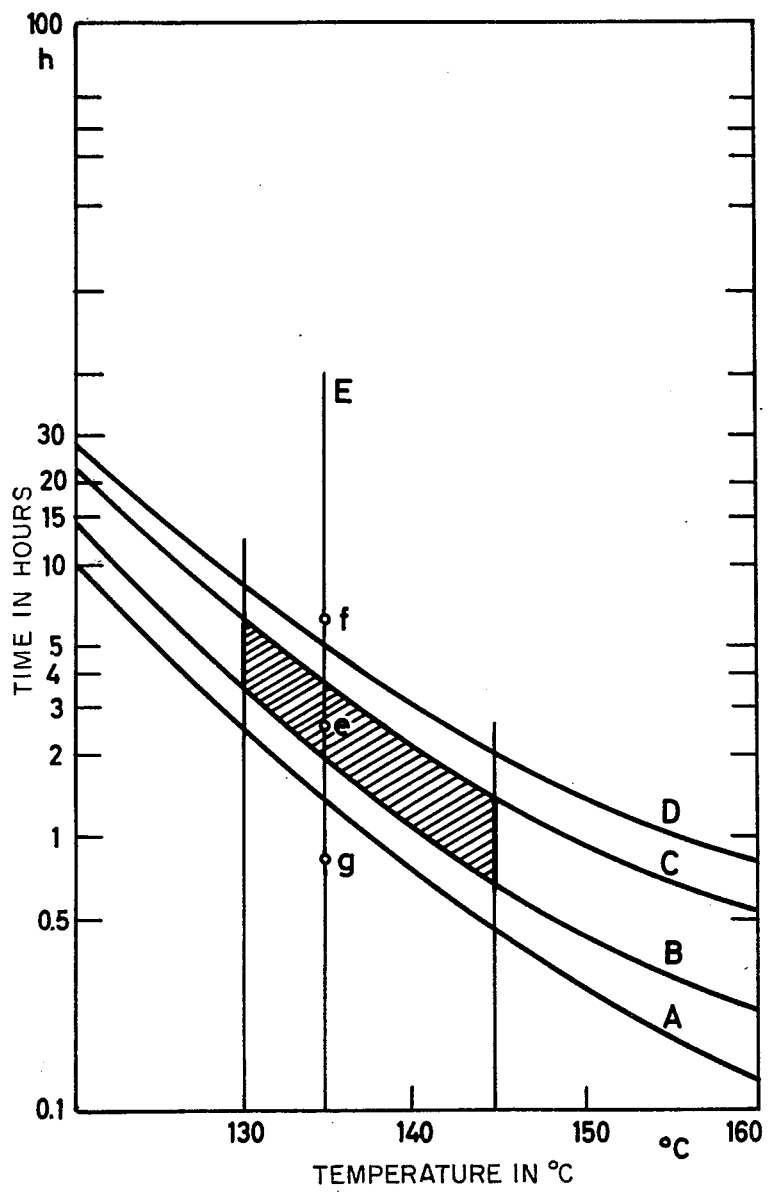

MANUFACTURE OF SULFUR CONCRETE

The term sulfur concrete is applied to mixtures of sulfur, as the binder, and a variety of aggregates. As with normal concrete, it is possible to use naturally occurring heavy aggregates, e.g. sand, gravel, stone chips or ballast, and naturally occuring light aggregates, e.g. pumice and tuff. Synthetically produced heavy aggregates, e.g. slag, or light aggregates, e.g. slag sand, porous cinders, brick chips, expanded clay, perlite and the like, can also be used. Sulfur concretes are manufactured by allowing mixtures of the said aggregate and molten sulfur to cool, whereupon the mixtures solidify to give products of a hardness comparable to concrete.

Compared to concretes based on cement, the above products offer advantages because they attain their final compressive strength and flexural tensile strength a short time after solidification, and not just after 28 days, because they can be re-used after remelting and because they are more resistant to dilute acids and to salts. An obvious disadvantage of sulfur concrete which, however, is inherent in the binder used, is its low heat resistance, since sulfur melts at 115° C. There are also a number of properties which primarily depend on the content of sulfur binder in the sulfur concrete and which change progressively and adversely as the sulfur content increases, e.g. the flammability, the linear coefficient of thermal expansion and the volume shrinkage during the melt-solid transition, which in turn leads to substantial problems in processing, e.g. the formation of cracks when large volumes of the concrete solidify. On the other hand, however, it has hitherto been necessary to use a high proportion of the sulfur binder in order to achieve a compressive strength and flexural strength comparable to that of cement-based concrete. A further disadvantage of sulfur concrete is that whilst it is fairly acid-resistant, it is sensitive to alkali.

Attempts to eliminate some of the above disadvantages have been made. Thus, it is known that polysulfides or polymercaptans may be added as plasticizers to sulfur melts, and that the solidified sulfur then has elastic properties. If sulfur modified in this way is used as the binder for the manufacture of sulfur concretes, it provides a flexible bond between the aggregate particles and this avoids, e.g., the crack formation referred to above, when large masses of sulfur concrete solidify.

The addition of dicyclopentadiene to sulfur concrete, intended to render it self-extinguishing, has also been disclosed.

Finally, coating compositions which contain from about 73 to 97 per cent by weight of elementary sulfur, from 1 to 7 per cent by weight of dicyclopentadiene, from 1 to 5 per cent by weight of glass fibers and from 1 to 15 per cent by weight of talc have also been disclosed. These compositions are employed, e.g., to line the sides of pits, and for a variety of other coating purposes. These coating compositions, containing dicyclopentadiene, have the advantage over coating compositions containing polysulfides that their odor is less objectionable and that they are less heat-sensitive, have a more suitable viscosity for spraying and are more fire-resistant.

It is an object of the present invention to provide a process for the manufacture of sulfur concrete in which the products have high compressive strength and flexural strength even at a comparatively low binder content. It is a further object of the present invention to provide a sulfur concrete of high resistance of alkalis.

We have found that these objects are achieved by mixing sulfur, dicyclopentadiene (DCP) and the aggregate at from 120° to 160° C, and choosing the period for which the sulfur and dicyclopentadiene interact, at the particular temperature, so that it lies on a straight line, parallel to the ordinate of FIG. 1, which intersects the abscissa at the particular temperature and is within the limits of the points of intersection of the straight line with the curves A and D.

The process according to the invention may be carried out in various ways. For example, it is possible to introduce from 2 to 8 per cent by weight, preferably from 4 to 6 per cent by weight, of dicyclopentadiene into a sulfur melt, allow the two components to react with one another for the corresponding temperature-dependent total reaction times shown in FIG. 1 and introduce the aggregate before the end of this reaction time. At the end of the reaction time, the mixture, whilst still hot and fluid, i.e., before solidification, is employed for its end use, e.g. for the manufacture of prefabricated building components, for the manufacture of salt-resistant, acid-resistant, alkali-resistant and solvent-resistant pipes, containers and the like, or for lining pipes and containers.

According to a particularly preferred embodiment of the process of the invention, a mixture of sulfur and dicyclopentadiene is prepared in a first step, allowing only from 80 to 95% of the period of interaction required at the particular temperature, and in a second step the resulting mixture is mixed with the aggregate within the time corresponding to the remainder of the period of interaction. The particular advantage of this method is that the first and second process steps may be carried out in different locations and at different times. Thus, a binder mixture can first be manufactured in a factory and can then be stored and/or transported without major storage space or transport space being required. The aggregate is only admixed at the site where the material is to be used, advantageously by adding the binder to the aggregate which has been heated to from 120° to 160° C. Of course, different temperatures from those in the first step may be used in the second step, provided they lie within the specified range. If a different temperature is chosen, the remaining period of interaction is extended or reduced, depending on this temperature.

Table 1 lists some of the points from curves A and D, and curves B and C, which define the preferred interaction times at various temperatures.

TABLE 1

| Temperature [° C] | Total reaction time [hrs] | | | |
|---|---|---|---|---|
| | A | B | C | D |
| 120 | 11.00 | 15.00 | 23.00 | 29.00 |
| 125 | 4.70 | 6.60 | 11.50 | 14.40 |
| 130 | 2.35 | 3.30 | 6.00 | 8.00 |
| 135 | 1.25 | 1.80 | 3.40 | 4.70 |
| 140 | 0.70 | 1.05 | 2.15 | 2.90 |
| 145 | 0.43 | 0.67 | 1.40 | 1.90 |
| 150 | 0.27 | 0.44 | 0.95 | 1.35 |
| 155 | 0.18 | 0.31 | 0.67 | 1.00 |
| 160 | 0.12 | 0.22 | 0.50 | 0.75 |

Preferably, temperatures of from 130° to 145° C are employed in the process of the invention.

The quality of a concrete is generally assessed from its compressive strength and flexural strength. For a given quality of binder, maximum compressive strength and flexural strength are achieved at certain optimum binder contents. To show the advantages of a sulfur concrete containing dicyclopentadiene, manufactured in accordance with the process of the invention, over other sulfur concretes, the maximum achievable strength, at optimum binder content, of the Comparative Products, is shown below. To permit a quantitative comparison, it is furthermore necessary to use the same aggregate for each product. Standard sand (NS) according to DIN 1,164 was used. The compressive strength and flexural strength were measured by a method based on DIN 1,164.

1. Sulfur concrete, without addition of DCP to the binder S.
Binder content: 36 per cent by weight of S
Compressive strength: 450 kp/cm$^2$
Flexural strength: 75 kp/cm$^2$.

2. Sulfur concrete with addition of DCP to the binder S, manufactured at the preferred temperatures and optimum period of interaction of the process according to the invention, and in accordance with the preferred embodiment of the said process. For example, temperature 135° C; total period of interaction 2.5 hours, compare point e on the straight line E in FIG. 1.
Binder content: 21.1 per cent by weight of S; 0.9 per cent by weight of DCP
Compressive strength: 720 kp/cm$^2$
Flexural strength: 150 kp/cm$^2$.

3. Sulfur concrete, with addition of DCP to the binder S, manufactured under conditions such that at least one parameter lies outside the limits of the process of the invention.

a. For example, temperature 135° C; total period of interaction 6.0 hours, compare point f on straight line E in FIG. 1.
Binder content: 21.1 per cent by weight of S; 0.9 per cent by weight of DCP
Compressive strength: 390 kp/cm$^2$
Flexural strength: 45 kp/cm$^2$.

b. For example, temperature 135° C; total period of interaction 0.8 hour, compare point g on straight line E in FIG. 1.
Binder content: 21.1 per cent by weight of S; 0.9 per cent by weight of DCP
Compressive strength: 410 kp/cm$^2$
Flexural strength: 55 kp/cm$^2$.

The four sets of data show that the sulfur concrete manufactured according to the process of the invention has substantially higher compressive strength and flexural strength than the other products. Within the limits defined, in FIG. 1, by the temperatures of 120° C and 160° C and the curves A and D, the compressive strengths achieved with sulfur concrete manufactured according to the process of the invention exceed 450 kp/cm$^2$. Under the preferred conditions defined in FIG. 1 by temperatures of 130° C and 145° C and curves B and C, compressive strengths greater than 600 kp/cm$^2$ are found. Surprisingly, the high compressive strengths are in fact measured on sulfur concrete formulations of relatively low binder content. However, as is shown by Table 2, a lower binder content also improves a number of other properties. In Table 2, the sulfur concrete without added DCP, described under 1), and the sulfur concrete manufactured according to the process of the invention with addition of dicyclopentadiene, and described under 2), are compared.

TABLE 2

| | (1) unmodified sulfur concrete | (2) sulfur concrete modified with DCP |
|---|---|---|
| Binder content (composition in % by weight) | NS 64 S 36 | NS 78 S 21.1 DCP 0.9 |
| Volume shrinkage on melt/solid transition (% by volume) | 0.9 | 0.3 |
| Resistance $\mu$ to water vapor diffusion | 8,070 | 22,220 |
| Water absorption (% by weight / % by volume) | 1.02/2.35 | 0.99/2.20 |
| Heat conductivity (kcal/mhr° C) | 0.65 | 0.40 |
| Coefficient of linear expension $\alpha$ (m/m° C) in the range of from 0 to 100° C | 39.1 | 20.4 |
| Bond stress $\sigma$ (kp/cm$^2$) reinforcing steel I-S-concrete | 32.0 | 45.0 |

Because of the high resistance $\mu$ to water vapor diffusion and the low water absorption of the products manufactured according to the invention, they may be expected to have excellent resistance to alternating freezing and thawing. The lower linear coefficient of thermal expansion $\alpha$, the improved bond stress $\delta$, and some experiments actually carried out, indicate that sulfur concrete manufactured according to the invention can be reinforced with steel.

The substantially increased resistance of the sulfur concrete, manufactured according to the invention, to aqueous solutions of salts, acids and alkalis is shown from Table 3 which follows. This table contains the calculated rates of wear (mm/year) measured from four weeks' corrosion tests on sulfur concretes, obtained in accordance with the process described above from 78 per cent by weight of standard sand (DIN 1,164) and 22 per cent by weight of binder comprising 95 per cent by weight of sulfur and 5 per cent by weight of dicyclopentadiene (code: NS/SD 22) and on unmodified sulfur concretes obtained from 76 per cent by weight of standard sand and 24 per cent by weight of sulfur (code: NS/S 24) or from 64 per cent by weight of standard sand and 36 per cent by weight of sulfur (code: NS/S 36). The tests were carried out in each case by storing two blocks of size 1×2×11 cm for 4 weeks in aqueous solutions of the inorganic compounds listed in the Table, or in the organic solvents, in each case with free access of air. The salts, acids and bases were each employed at 3 concentrations.

The solvents were topped up to compensate for evaporation. The sign ./. indicates that no wear or even a slight increase in weight (NaCl solutions) was found.

The NS/ND 22 sulfur concrete was manufactured as follows: 95 parts by weight of sulfur are mixed with 95 parts by weight of liquid dicyclopentadiene at 135° C and left at this temperature for 135 minutes. The liquid binder is then poured onto 354.5 parts by weight of DIN 1,164 standard sand, which is at the same temperature, and mixing is continued for 15 minutes.

TABLE 3

| Data relating to the chemical resistance of sulfur concretes | | | |
|---|---|---|---|
| | | Wear in mm/year of | |
| Chemicals | NS/SD 22 | NS/S 24 | NS/S 36 |
| Bases | | | |
| NaOH 0.1 mole/l | 0.01 | 0.02 | 0.02 |
| 1.0 mole/l | 0.10 | 0.78 | 0.28 |
| 6.1 moles/l | 2.77 | completely dissolved after from 3 to 4 days | |
| Acids | | | |
| HCl 0.1 mole/l | 0.01 | 0.04 | 0.02 |
| 1.0 mole/l | 0.03 | 0.09 | 0.05 |

TABLE 3-continued

Data relating to the chemical resistance of sulfur concretes

| Chemicals | | NS/SD 22 | Wear in mm/year of NS/S 24 | NS/S 36 |
|---|---|---|---|---|
| H$_2$SO$_4$ | 5.3 moles/l | ./. | 0.13 | 0.06 |
| | 0.1 mole/l | 0.02 | 0.03 | 0.02 |
| | 1.0 mole/l | 0.03 | 0.11 | 0.06 |
| | 6.6 moles/l | 0.02 | 0.02 | ./. |
| Salts | | | | |
| NaCl | 0.1 mole/l | 0.0 | 0.02 | 0.02 |
| | 1.0 mole/l | ./. | 0.01 | ./. |
| | 5.4 moles/l | ./. | 0.02 | ./. |
| Na$_2$SO$_3$ | 1.9 moles/l | 0.04 | 0.36 | 0.31 |
| Organic solvents | | | | |
| Methanol | | 0.03 | 0.06 | 0.02 |
| Acetone | | 0.09 | 0.18 | 0.06 |
| Kerosine | | 0.54 | 1.01 | 0.85 |
| Methylene chloride | | 1.80 | 5.35 | 2.72 |
| Toluene | | 2.38 | 6.92 | 4.32 |
| Cyclohexane | | 2.58 | 11.35 | 4.90 |

The Table shows the markedly better corrosion characteristics of dicylopentadiene-modified sulfur concrete NS/SD 22 compared to NS/S 24. The fact that the greater corrosion resistance is not merely due to the more completely closed surface of the modified sulfur concrete is shown by the comparison with NS/S 36. Here again the rate of corrosion is greater than for NS/SD 22. (Because of the good wetting of the sand grains by the modified sulfur binder in NS/SD 22, this concrete has a smooth closed surface even at this binder content, whilst the surface of NS/S 24 still appears rough and is easily damaged. When pure sulfur is used, a smooth closed surface is only achieved when the sulfur content is as much as 36 per cent by weight). The greatest difference in corrosion resistance of the sulfur concretes is found in 20% strength NaOH (6.1 moles/l); whilst the unmodified sulfur concrete blocks have been completely destroyed after from 3 to 4 days, the blocks of the sulfur concrete modified with dicyclopentadiene show only slight surface etching after 4 weeks.

The results of one years' weathering tests, soil burying tests and reinforcement tests on samples of NS/SD 22 and NS/S 24 are shown below:

| | NS/SD 22 | NS/S 24 |
|---|---|---|
| Weathering (wear in mm/year) | 0.011 | 0.025 |
| Soil burying (wear in mm/year) | 0.007 | 0.027 |
| Reinforcement with structural steel I ($\phi$ 8 mm) | no destruction | crack formation |

The one year's weathering test was carried out by producing four 7 cm test cubes of each material and storing these in the open. The soil burying test was carried out by producing eight 1×5×10 cm slabs of each material and burying these 10 cm deep in garden soil. The average rates of wear again confirm the greater corrosion resistance of the sulfur concrete modified with dicyclopentadiene.

The ability to reinforce a constructional material with steel, or bond it to steel, is of great practical importance. To test this, four 7 cm cubes of each material were provided with embedded or projecting steel rods. They were stored for 8 days in concentrated NaCl solution to initiate corrosion of the steel and were then weathered for one year. All four sulfur concrete cubes made from NS/S 24 were destroyed by the test, due to under-rusting followed by cracking. All four sulfur concrete cubes made from NS/SD 22 were completely unchanged.

These results show the superiority of the sulfur concrete manufactured by the process of the invention using dicyclopentadiene, over sulfur concrete manufactured by conventional processes, in respect of resistance to solvents, salt, acid and, especially, alkali. Because of these superior properties, the sulfur concrete manufactured using dicyclopentadiene may be used for the manufacture of pipes, containers and the like which are resistant to salt, acid, alkali and chemicals, and for lining pipes and containers.

We claim:

1. A process for the manufacture of sulfur concrete by mixing a binder of molten sulfur and dicyclopentadiene with aggregate and cooling the resulting mixture, wherein sulfur, dicyclopentadiene and the aggregate are mixed at from 120° to 160° C, and the period for which the sulfur and dicyclopentadiene interact, at the particular temperature, is chosen so that it lies on a straight line, parallel to the ordinate of FIG. 1, which intersects the abscissa at the particular temperature and is within the limits of the points of intersection of the straight line with the curves A and D.

2. A process as set forth in claim 1, wherein the period of interaction is within the limits of the points of intersection of the straight line with the curves B and C.

3. A process as set forth in claim 1, wherein the mixture contains from 2 to 8 per cent by weight, based on sulfur, of dicyclopentadiene.

4. A process as set forth in claim 1, wherein a mixture of sulfur and the aggregate is brought to the desired temperature within the range of 120° C to 160° C and dicyclopentadiene is added whilst continuing the mixing.

5. A process as set forth in claim 1, wherein, in a first step, a mixture of sulfur and dicyclopentadiene is prepared at from 120° to 160° C, allowing only from 80 to 95% of the total period of interaction required at the specific temperature chosen within the range of 120° to 160° C, and in a second step the resulting mixture is mixed with the aggregate, again at from 120° to 160° C, within the time corresponding to the remainder of the period of interaction.

6. A process as set forth in claim 5, wherein the first and second process steps are carried out in different locations and at different times.

7. A process as set forth in claim 1, wherein the mixing is carried out at from 130° to 145° C.

8. A process as set forth in claim 1, wherein the mixture contains from 4 to 6 per cent by weight, based on sulfur, of dicyclopentadiene.

* * * * *